(12) United States Patent
Liu

(10) Patent No.: US 7,957,692 B2
(45) Date of Patent: Jun. 7, 2011

(54) SIGNAL RECEIVER CIRCUIT AND METHOD OF IMPLEMENTATION

(75) Inventor: Yu-Wei Liu, Tao Yuan Hsien (TW)

(73) Assignee: Chaparral Communications, Inc., San Jose, CA (US)

( * ) Notice: Subject to any disclaimer, the term of this patent is extended or adjusted under 35 U.S.C. 154(b) by 900 days.

(21) Appl. No.: 11/975,490

(22) Filed: Oct. 19, 2007

(65) Prior Publication Data

US 2009/0102735 A1 Apr. 23, 2009

(51) Int. Cl.
*H04H 20/74* (2008.01)
*H04B 7/165* (2006.01)
*H04B 7/14* (2006.01)
*H04B 1/10* (2006.01)
*H04N 5/50* (2006.01)
*H04N 7/173* (2011.01)
*H01Q 19/06* (2006.01)
*H01Q 13/00* (2006.01)

(52) U.S. Cl. ........... 455/3.02; 455/23; 455/24; 455/311; 348/735; 343/753; 343/754; 343/786; 725/105

(58) Field of Classification Search ................. 455/3.02, 455/23, 24, 311; 348/735; 343/753–754, 343/786; 725/105
See application file for complete search history.

(56) References Cited

U.S. PATENT DOCUMENTS

| | | | | |
|---|---|---|---|---|
| 4,498,061 A | * | 2/1985 | Morz et al. | 333/21 A |
| 5,940,750 A | * | 8/1999 | Wang | 455/318 |
| 5,959,592 A | * | 9/1999 | Petruzzelli | 725/68 |
| 6,864,850 B2 | * | 3/2005 | Imaizumi et al. | 343/776 |
| 2002/0097821 A1 | * | 7/2002 | Hebron et al. | 375/346 |
| 2004/0056813 A1 | * | 3/2004 | Carter et al. | 343/754 |
| 2006/0279373 A1 | * | 12/2006 | Keating et al. | 333/24.3 |
| 2007/0019117 A1 | * | 1/2007 | Nakano | 348/735 |
| 2007/0089142 A1 | * | 4/2007 | Norin et al. | 725/63 |
| 2007/0222660 A1 | * | 9/2007 | Stagliano et al. | 342/26 R |
| 2008/0012756 A1 | * | 1/2008 | Stagliano et al. | 342/26 R |
| 2008/0209478 A1 | * | 8/2008 | Santoru et al. | 725/68 |
| 2008/0297428 A1 | * | 12/2008 | Wu | 343/786 |
| 2009/0254955 A1 | * | 10/2009 | Petruzzelli | 725/105 |

* cited by examiner

*Primary Examiner* — Lewis G West
*Assistant Examiner* — Bobbak Safaipour

(57) ABSTRACT

Embodiments of the present invention recite an improved signal receiver circuit and a method of implementation. In one embodiment, a first signal pathway of a low-noise block feedhorn comprises a ceramic low-pass filter coupled with a first polarity signal input. In accordance with embodiments of the present invention, a second signal pathway of the low-noise block feedhorn comprises ceramic high-pass filter coupled with a second polarity signal input.

9 Claims, 3 Drawing Sheets

SIGNAL RECEIVER CIRCUIT AND METHOD OF IMPLEMENTATION

FIELD OF THE INVENTION

Embodiments of the present invention are related to the field of signal processing.

BACKGROUND OF THE INVENTION

Satellite based systems are increasingly used for the transmission of television programming. Typically, a geostationary satellite receives a terrestrial signal and downlinks the signal to ground based antennas located in the satellite's coverage area. The ground based antennas typically include a parabolic antenna and a low noise block which amplifies, filters, and shifts the frequencies of the received signal to an intermediate frequency for coupling with a receiver.

In order to increase the bandwidth of the signal from the satellite, the signal is sent in two polarities. For example, the two polarities may be out of phase by 90° which doubles the usable bandwidth of the satellite signal. The low noise block of the ground based antenna must then separate the separately polarized signals and send them to the receiver.

At times, it is difficult to receive optimum performance from satellite signals. For example, interference from one broadcast channel can degrade the reception of other channels. For a user, this results in less picture definition and a higher signal to noise ratio.

SUMMARY OF THE INVENTION

Embodiments of the present invention recite an improved signal receiver circuit and a method of implementation. In one embodiment, a first signal pathway of a low-noise block feedhorn comprises a ceramic low-pass filter coupled with a first polarity signal input. In accordance with embodiments of the present invention, a second signal pathway of the low-noise block feedhorn comprises ceramic high-pass filter coupled with a second polarity signal input.

BRIEF DESCRIPTION OF THE DRAWINGS

The accompanying drawings, which are incorporated in and form a part of this specification, illustrate embodiments of the present invention and, together with the description, serve to explain the principles of the invention. Unless specifically noted, the drawings referred to in this description should be understood as not being drawn to scale.

DETAILED DESCRIPTION OF THE PREFERRED EMBODIMENT

Reference will now be made in detail to embodiments of the present invention, examples of which are illustrated in the accompanying drawings. While the present invention will be described in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Figure 1:
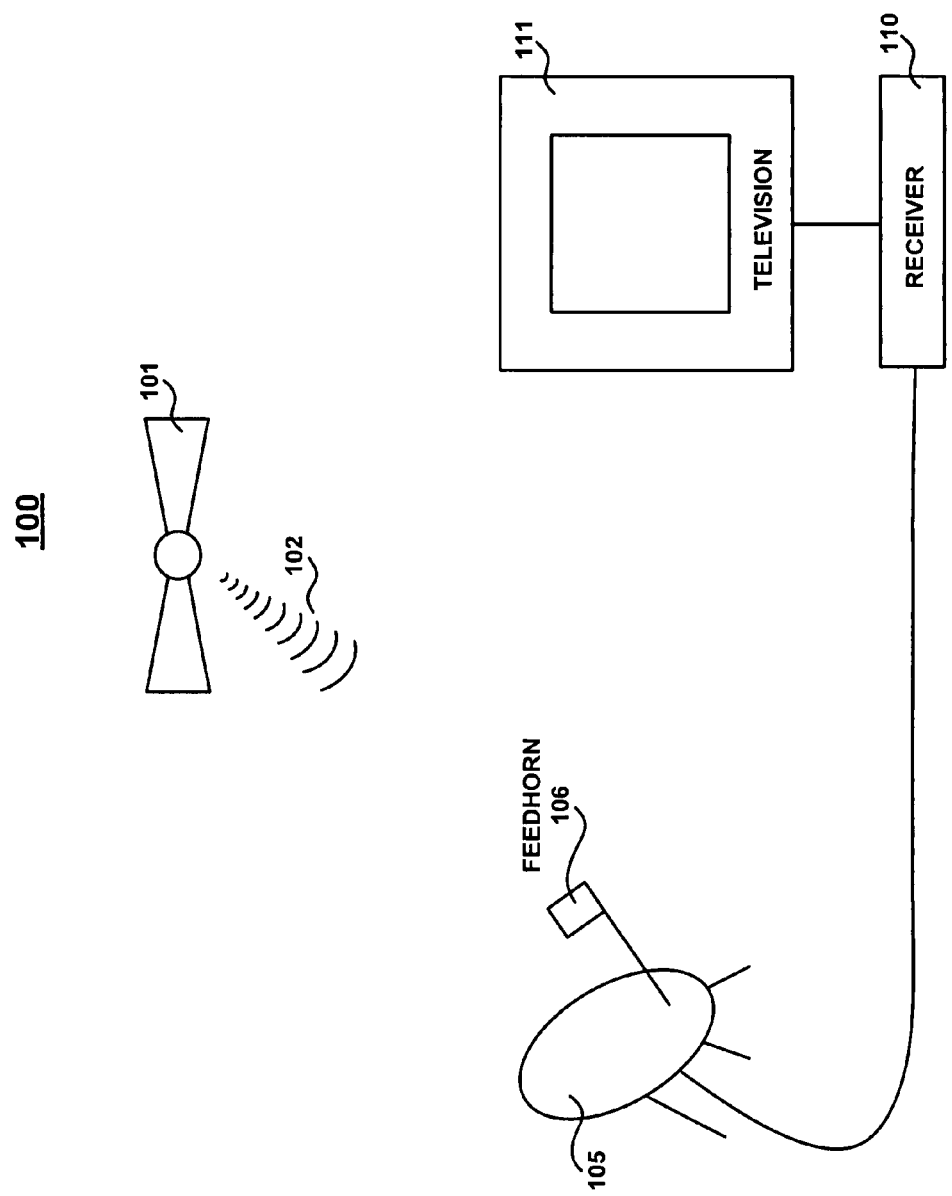
FIG. 1 shows components of a satellite signal distribution system in accordance with embodiments of the present invention.

FIG. 1 shows components of a satellite signal distribution system 100 in accordance with embodiments of the present invention. In FIG. 1, an earth orbiting satellite 101 sends a downlink signal 102 which is received by an antenna system comprising an antenna dish 105 and a feedhorn assembly 106. In embodiments of the present invention, feedhorn assembly 106 comprises a low-noise block converter feedhorn (LNBF), examples of which are known in the art. Typically, an LNBF comprises an electrical circuit, which amplifies and down-converts downlink signal 102 into an intermediate frequency, with a feedhorn, which receives the downlink signal from antenna dish 105. In embodiments of the present invention, downlink signal 102 comprises a signal in the $K_u$ band of 11.7 GHz to 12.7 GHz.

In embodiments of the present invention, system 100 further comprises a receiver 110 which is typically communicatively coupled with feedhorn 106 via a coaxial cable. Receiver 110 receives the intermediate frequency signal from feedhorn assembly 106 and is used to select a particular television channel which is then shown on television 111.

Figure 2:
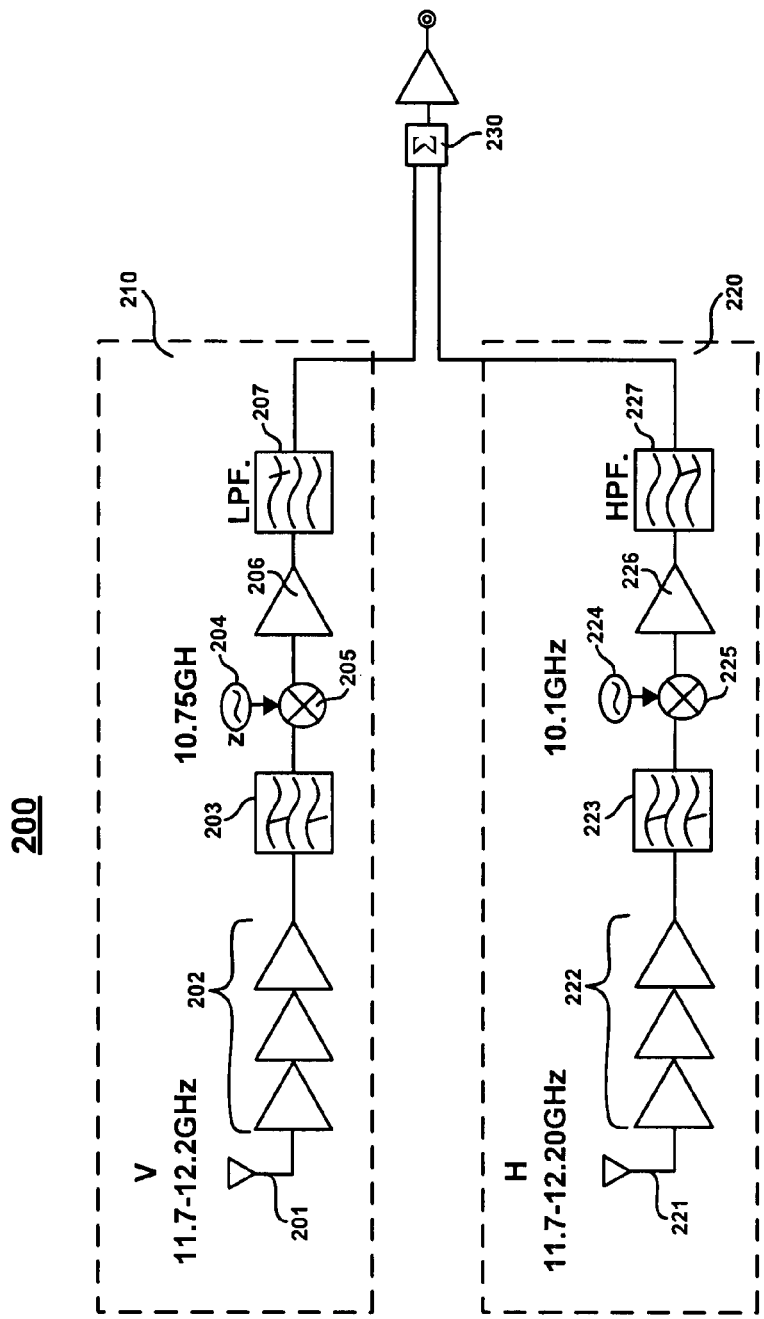
FIG. 2 is a schematic diagram of an improved signal receiver circuit in accordance with embodiments of the present invention.

FIG. 2 is a schematic diagram of an improved signal receiver circuit 200 in accordance with embodiments of the present invention. In accordance with embodiments of the present invention, signal receiver circuit 200 is utilized as a component of feedhorn assembly 106 of FIG. 1. It is noted that for the sake of brevity, some of the components shown in FIG. 2 will not be described in detail in the following discussion. In FIG. 2, signal receiver circuit 200 further comprises a first signal pathway 210 and a second signal pathway 220 which receive downlink signal 102. In embodiments of the present invention, first signal pathway 210 comprises a first polarity signal input 201 for receiving a first polarity signal. In one embodiment of the present invention, the first polarity signal comprises a vertical polarity signal. However, in another embodiment of the present invention, the first polarity signal comprises a clockwise polarity signal. In another embodiment, the first polarity signal comprises a counter-clockwise polarity signal.

In embodiments of the present invention, first signal pathway 210 further comprises an amplifier stage 202 which is used for pre-amplifying the signal before it is mixed to a desired frequency. In one embodiment, amplifier stage 202 comprises a High Electron Mobility Transistor (HEMT) as a low-noise amplifier (LNA). In one embodiment, amplifier stage 202 is made by a GaAs process. As shown in FIG. 2, amplifier stage 202 is a three stage amplifier in one embodiment. However, in other embodiments of the present invention, amplifier stage 202 comprises a two stage, or single stage, amplifier. In one embodiment, first signal pathway 210 further comprises a bandbass filter 203 for removing unwanted frequency components. In one embodiment, band-pass filter 203 comprises a microstrip band-pass filter.

In one embodiment, first signal pathway 210 further comprises a mixer 205 coupled with a 10.75 GHz local oscillator 204. In one embodiment, mixer 205 comprises a diode such as a Schottky diode for example. In another embodiment, mixer 205 comprises a Field Effect Transistor (FET). In another embodiment, mixer 205 comprises a Monolithic Microwave Integrated Circuit (MMIC). It is noted that embodiments of the present invention are not limited to the mixer circuits specifically described above. In one embodiment, first signal pathway 210 further comprises an intermediate frequency amplifier 206. In one embodiment, intermediate frequency amplifier 206 comprises a two-stage amplifier. In one embodiment, the stages comprising intermediate frequency amplifier 206 are distinguished by their respective saturated load power.

In one embodiment, first signal pathway 210 further comprises a ceramic low-pass filter 207 which is coupled with intermediate frequency amplifier 206. Ceramic low-pass filter 207 is for allowing desired signals to pass while removing unwanted frequency signals. In one embodiment, low-pass filter 207 exhibits a band rejection of at least 30 decibels. In embodiments of the present invention, ceramic low-pass filter 207 is communicatively coupled with a signal combining device 230.

In embodiments of the present invention, second signal pathway 220 further comprises an amplifier stage 222 which is used for pre-amplifying the signal before it is mixed to a desired frequency. In one embodiment, amplifier stage 222 comprises a High Electron Mobility Transistor (HEMT) as a low-noise amplifier (LNA). In one embodiment, amplifier stage 222 is made by a GaAs process. As shown in FIG. 2, amplifier stage 222 is a three stage amplifier in one embodiment. However, in other embodiments of the present invention, amplifier stage 222 comprises a two stage, or single stage, amplifier. In one embodiment, second signal pathway 220 further comprises a bandbass filter 223 for removing unwanted frequency components.

In one embodiment, band-pass filter 223 comprises a microstrip band-pass filter. In one embodiment, first signal pathway 220 further comprises a mixer 225 coupled with a 10.1 GHz local oscillator 224. In one embodiment, mixer 225 comprises a diode such as a Schottky diode for example. In another embodiment, mixer 225 comprises a Field Effect Transistor (FET). In another embodiment, mixer 225 comprises a Monolithic Microwave Integrated Circuit (MMIC). It is noted that embodiments of the present invention are not limited to the mixer circuits specifically described above. In one embodiment, second signal pathway 220 further comprises an intermediate frequency amplifier 226. In one embodiment, intermediate frequency amplifier 226 comprises a two-stage amplifier. In one embodiment, the stages comprising intermediate frequency amplifier 226 are distinguished by their respective saturated load power.

In one embodiment, second signal pathway 220 further comprises a ceramic high-pass filter 227 which is coupled with intermediate frequency amplifier 226. Ceramic high-pass filter 227 is for allowing desired signals to pass while removing unwanted frequency signals. In embodiments of the present invention, high-pass filter 227 exhibits a band rejection of at least 30 decibels. In embodiments of the present invention, ceramic high-pass filter 227 is communicatively coupled with a signal combining device 230.

In operation, downlink signal 102 typically comprises 10 channels in a first polarity (e.g., in a vertical polarity) and 10 channels in a second polarity (e.g. a horizontal polarity). In another embodiment, the first polarity comprises a clockwise, or counter-clockwise, polarity and the second polarity comprises a counter-clockwise, or clockwise, polarity. In one embodiment, mixer 205 mixes vertically polarized signals from downlink signal 102 with the 10.75 GHz signal from local oscillator 204 to produce an intermediate frequency signal with a frequency between 950 megahertz (MHz) and 1450 MHz. Similarly, mixer 225 mixes horizontally polarized signals from downlink signal 102 with the 10.1 GHz signal from local oscillator 224 to produce a second intermediate frequency signal with a frequency between 1600 MHz and 2100 MHz.

In embodiments of the present invention, the intermediate frequency signal output from intermediate frequency amplifier 206 is input to ceramic low-pass filter 207. Similarly, the intermediate frequency signal output from intermediate frequency amplifier 226 is input to ceramic high-pass filter 227. The use of a ceramic filter (e.g., ceramic low-pass filter 207 and ceramic high-pass filter 227) in accordance with embodiments of the present invention is advantageous over conventional LNBF designs which use other circuit designs. For example, the use of ceramic high-pass filter 227 and ceramic low-pass filter 207 reduce adjacent channel interference which may be exhibited in conventional LNBF designs. More specifically, embodiments of the present invention exhibit improved band rejection of at least 30 decibels in comparison with conventional LNBF designs. Additionally, embodiments of the present invention exhibit greater attenuation in the middle of the stop frequency (e.g., up to 20 decibels) as opposed to 10 decibels exhibited in conventional LNBF designs. As a result, embodiments of the present invention remove unwanted frequency bands more effectively than conventional LNBF designs. This results in less interference between frequency bands, improved signal to noise ratios, and a clearer picture displayed upon television 111.

In embodiments of the present invention, applying two different local oscillators (e.g., 204 and 224) to respective signal polarities facilitates creating an intermediate frequency which can be distributed between 950 and 2100 MHz. In one embodiment, signal combining device 230 receives an intermediate frequency signal from first signal pathway 210 in the range of 950-1450 MHz and a second intermediate frequency signal from second signal pathway 220 in the range of 1600-2100 MHz. Furthermore, there is no need to switch between polarities when switching between a channel which has been processed on first signal pathway 210 and a channel which has been processed on second signal pathway 220.

Figure 3:
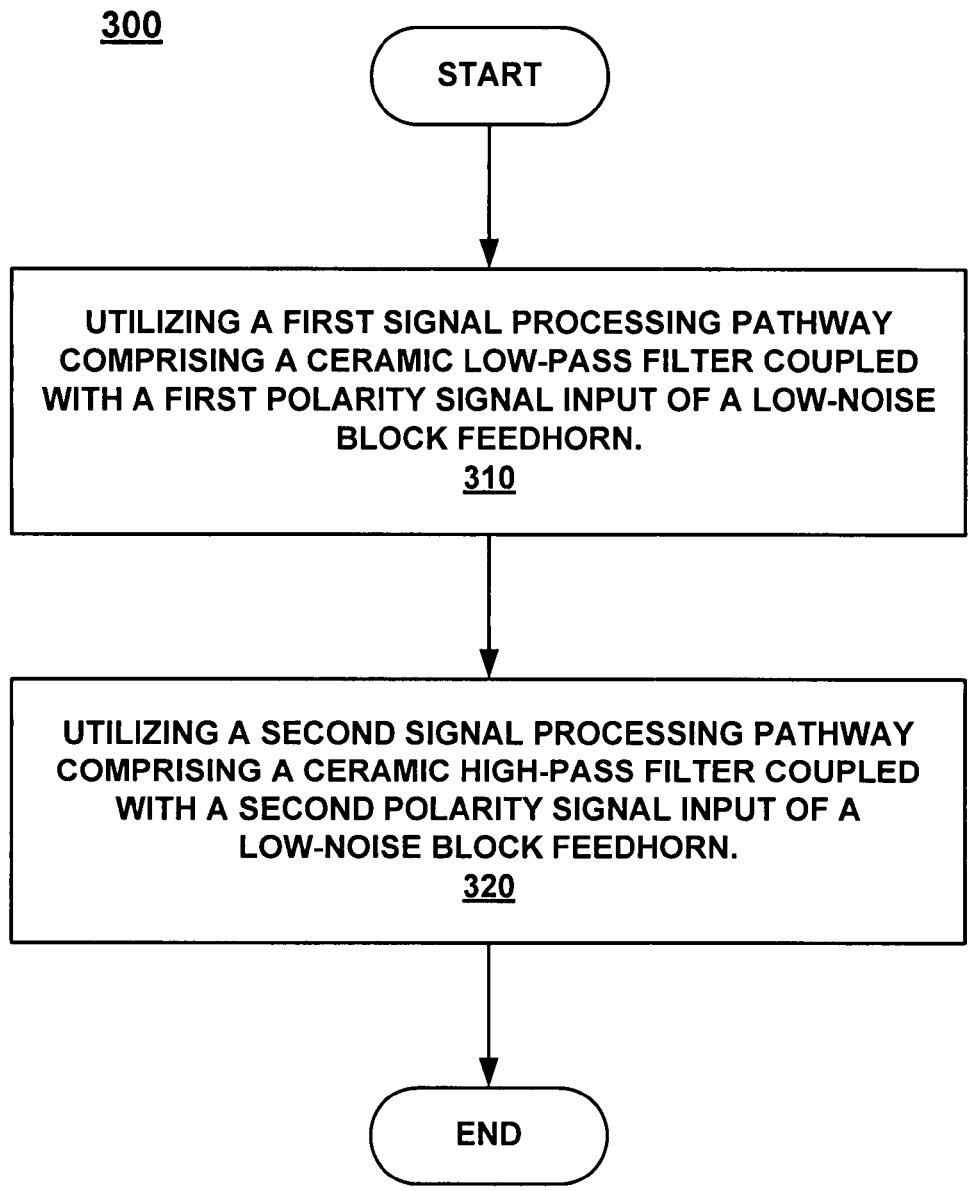
FIG. 3 is a flowchart of a method for implementing an improved signal receiver circuit in accordance with embodiments of the present invention.

FIG. 3 is a flowchart of a method 300 for implementing an improved signal receiver circuit in accordance with embodiments of the present invention. In step 310 of FIG. 3, a first signal pathway is utilized comprising a ceramic low-pass filter coupled with a first polarity signal input of a low-noise block feedhorn. As discussed above with reference to FIG. 2, a signal of a first polarity (e.g., a vertical polarity, a clockwise polarity, or a counter-clockwise polarity) is processed on first signal pathway 210 which comprises a component of LNBF 106. In embodiments of the present invention, first signal pathway 210 comprises a ceramic low-pass filter 207.

In step 320 of FIG. 3, a second signal pathway is utilized comprising a ceramic high-pass filter coupled with a second polarity signal input of the low-noise block feedhorn. As discussed above with reference to FIG. 2, a signal of a second polarity (e.g., a horizontal polarity, a clockwise polarity, or a counter-clockwise polarity) is processed on second signal pathway 220 which comprises a component of LNBF 106. In embodiments of the present invention, second signal pathway 220 comprises a ceramic high-pass filter 227.

As discussed above, embodiments of the present invention are advantageous due to the greater band rejection and attenuation compared to previously used satellite television feedhorn assemblies. As a result, embodiments of the present invention exhibit less interference between frequency bands, improved signal to noise ratios, and a clearer picture than previously used satellite television feedhorn assemblies.

The preferred embodiment of the present invention, an improved signal receiver circuit and method of implementation, is thus described. While the present invention has been described in particular embodiments, it should be appreciated that the present invention should not be construed as limited by such embodiments, but rather construed according to the following claims.

What is claimed is:

1. An improved signal receiver circuit comprising:
   a first signal pathway comprising:
      a first polarity signal input of a low-noise block feedhorn, said first polarity signal input configured for receiving a first polarity signal, said first polarity signal being in a frequency range between 11.7 gigahertz (GHz) and 12.2 GHz;
      a first amplifier stage configured for pre-amplifying said first polarity signal to achieve an amplified first polarity signal;
      a 10.75 GHz local oscillator coupled with said first amplifier stage, said 10.75 GHz local oscillator configured for receiving said amplified first polarity signal and converting it to a second signal with a frequency range between 950 and 1450 megahertz (MHz);
      a first intermediate frequency amplifier coupled with said 10.75 GHz local oscillator, said first intermediate frequency amplifier configured for receiving said second signal; and
      a ceramic low-pass filter coupled with said first intermediate frequency amplifier; and
   a second signal pathway comprising:
      a second polarity signal input of a low-noise block feedhorn, said second polarity signal input configured for receiving a second polarity signal, said second polarity signal being in a frequency range between 11.7 GHz and 12.2 GHz;
      a second amplifier stage configured for pre-amplifying said second polarity signal to achieve an amplified second polarity signal;
      a 10.10 GHz local oscillator coupled with said second amplifier stage, said 10.10 GHz local oscillator configured for receiving said amplified second polarity signal and converting it to a third signal with a frequency range between 1600 and 2100 MHz;
      a second intermediate frequency amplifier coupled with said 10.10 GHz local oscillator, said second intermediate frequency amplifier configured for receiving said third signal; and
      a ceramic high-pass filter coupled with said second intermediate frequency amplifier.

2. The signal receiver circuit of claim 1 further comprising: a signal combining device for combining said second signal and said third signal at a single output.

3. The signal receiver circuit of claim 2 wherein said second signal and said third signal can be accessed at said single output without the necessity of switching polarities.

4. The signal receiver circuit of claim 1 wherein said second signal comprises a transverse magnetic signal generated by said ceramic low-pass filter and said third signal comprises a transverse magnetic signal generated by said ceramic high-pass filter.

5. A method for implementing an improved signal receiver circuit, said method comprising:
utilizing a first signal pathway comprising a ceramic low-pass filter coupled with a first polarity signal input of a low-noise block feedhorn, wherein said utilizing said first signal pathway comprises:
   using a first amplifier stage coupled with said first polarity signal input, said first amplifier stage configured for pre-amplifyinq said first polarity signal input;
   using a 10.75 gigahertz (GHz) local oscillator coupled with said first amplifier stage to convert said first polarity signal into a second signal with a frequency range between 950 and 1450 megahertz (MHz), wherein said first polarity signal is received in a frequency range between 11.7 GHz and 12.2 GHz;
   using a first intermediate frequency amplifier coupled with said 10.75 GHz local oscillator, said first intermediate frequency amplifier configured for amplifying said second signal to achieve an amplified second signal; and
   using a ceramic low-pass filter to access said amplified second signal, said ceramic low-pass filter being coupled with said first intermediate frequency amplifier; and
utilizing a second signal pathway comprising a ceramic high-pass filter coupled with a second polarity signal input of said low-noise block feedhorn, wherein said utilizing said second signal pathway comprises:
   using a second amplifier stage coupled with said second polarity signal input, said second amplifier stage configured for pre-amplifying said second polarity signal input;
   using a 10.10 GHz local oscillator coupled with said second amplifier stage input to convert said second polarity signal into a third signal with a frequency range between 1600 and 2100 MHz which is accessed by said ceramic high-pass filter, wherein said second polarity signal is received in a frequency range between 11.7 GHz and 12.2 GHz;
   using a second intermediate frequency amplifier coupled with said 10.10 GHz local oscillator, said second intermediate frequency amplifier configured for amplifying said third signal to achieve an amplified third signal; and
   using a ceramic high-pass filter to access said amplified third signal, said ceramic high-pass filter being coupled with said second intermediate frequency amplifier.

6. The method as recited in claim 5 further comprising: combining said second signal and said third signal at a single output.

7. The method as recited in claim 6 further comprising: accessing said second signal and said third signal at said single output without the necessity of switching polarities.

8. A low-noise block feedhorn comprising:
   a first signal pathway comprising:
      a vertical polarity signal input for a first signal in a frequency range between 11.7 gigahertz (GHz) and 12.2 GHz;
      a first amplifier stage configured for pre-amplifyinq said first signal to achieve an amplified first signal;
      a 10.75 GHz local oscillator coupled with said vertical polarity signal input via a first mixer for receiving said amplified first signal and converting it to a second signal with a frequency range between 950 and 1450 megahertz (MHz);
      a first intermediate frequency amplifier coupled with said 10.75 GHz local oscillator, said first intermediate frequency amplifier configured for amplifying said second signal to achieve an amplified second signal;

a ceramic low-pass filter coupled with said first intermediate frequency amplifier, said ceramic low-pass filter configured for receiving said amplified second signal, said ceramic low-pass filter exhibiting a band rejection of at least 30 decibels coupled with said mixer; and a second signal pathway comprising:

a horizontal polarity signal input for a third signal in a frequency range between 11.7 GHz and 12.2 GHz;

a second amplifier stage configured for pre-amplifyinq said third signal to achieve an amplified third signal;

a 10.10 GHz local oscillator coupled with said horizontal polarity signal input via a second mixer for receiving said amplified third signal and converting it to a fourth signal with a frequency range between 1600 and 2100 MHz;

a second intermediate frequency amplifier coupled with said 10.10 GHz local oscillator, said second intermediate frequency amplifier configured for amplifying said fourth signal to achieve an amplified fourth signal;

a ceramic high-pass filter coupled with said second intermediate frequency amplifier, said ceramic high-pass filter configured for receiving said amplified fourth signal, said ceramic high-pass filter exhibiting a band rejection of at least 30 decibels coupled with said second mixer; and a signal combining device configured for receiving said second and fourth signals from said ceramic low-pass filter and said ceramic high-pass filters, respectively, for combining said third signal and said fourth signal at a single output and wherein said third signal and said fourth signal comprise transverse magnetic signals.

9. An improved signal receiver circuit comprising:

a first signal pathway comprising:

a first polarity signal input of a low-noise block feedhorn, said first polarity signal input configured for receiving a first polarity signal, said first polarity signal being in a frequency range between 11.7 gigahertz (GHz) and 12.2 GHz;

a first amplifier stage configured for pre-amplifying said first polarity signal to achieve an amplified first polarity signal, said first amplifier stage being one of a single stage amplifier, a two stage amplifier or a three stage amplifier;

a 10.75 GHz local oscillator coupled with said first amplifier stage, said 10.75 GHz local oscillator configured for receiving said amplified first polarity signal and converting it to a second signal with a frequency range between 950 and 1450 megahertz (MHz);

a first intermediate frequency amplifier coupled with said 10.75 GHz local oscillator, said first intermediate frequency amplifier configured for receiving and amplifying said second signal to achieve an amplified second signal; and a ceramic low-pass filter coupled with said first intermediate frequency amplifier, said ceramic low-pass filter configured for receiving said amplified second signal and generating a second signal comprising a first transverse magnetic signal;

a second signal pathway comprising:

a second polarity signal input of a low-noise block feedhorn, said second polarity signal input configured for receiving a second polarity signal, said second polarity signal being in a frequency range between 11.7 GHz and 12.2 GHz;

a second amplifier stage configured for pre-amplifying said second polarity signal to achieve an amplified second polarity signal, said second amplifier stage being one of a single stage amplifier, a two stage amplifier or a three stage amplifier;

a 10.10 GHz local oscillator coupled with said second amplifier stage, said 10.10 GHz local oscillator configured for receiving said amplified second polarity signal and converting it to a third signal with a frequency range between 1600 and 2100 MHz;

a second intermediate frequency amplifier coupled with said 10.10 GHz local oscillator, said second intermediate frequency amplifier configured for receiving and amplifying said third signal to achieve an amplified third signal; and a ceramic high-pass filter coupled with said second intermediate frequency amplifier, said ceramic high-pass filter configured for receiving said amplified third signal and generating a third signal comprising a second transverse magnetic signal; and a signal combining device coupled with said ceramic low-pass and high-pass filters, said signal combining device configured for combining said second and third signals generated by said ceramic low-pass and high-pass filters, respectively, at a single output, wherein said second and third signals can be accessed at said signal output without the necessity of switching polarities.

* * * * *